United States Patent [19]

Hoole

[11] 4,156,797

[45] May 29, 1979

[54] FILTER FOR VOICE OPERATED TRIGGERING CIRCUITS

[75] Inventor: Tyson C. A. Hoole, Bellevue, Wash.

[73] Assignee: The Boeing Company, Seattle, Wash.

[21] Appl. No.: 931,220

[22] Filed: Aug. 4, 1978

[51] Int. Cl.² ............................................. H04M 1/00
[52] U.S. Cl. .................................. 179/1 VC; 179/1 P; 179/1 D
[58] Field of Search ................ 179/1 VC, 1 VL, 1 P, 179/1 D; 307/234; 333/17; 364/724

[56] References Cited

U.S. PATENT DOCUMENTS

| | | | |
|---|---|---|---|
| 3,873,926 | 3/1975 | Wright | 179/1 VC |
| 3,944,753 | 3/1976 | Proctor et al. | 179/1 P |
| 3,947,636 | 3/1976 | Edgar | 179/1 P |

Primary Examiner—Kathleen H. Claffy
Assistant Examiner—E. S. Kemeny
Attorney, Agent, or Firm—Conrad O. Gardner; B. A. Donahue

[57] ABSTRACT

A filter for reducing the effective keying passband of a VOX (voice operated relay) responsive to output signals comprising pulses which follow the peak frequency pattern of the audio input pulses includes a pair of retriggerable monostable multivibrators, a "D" type flip-flop circuit, and a NOR gate which produces positive output pulses used to trigger ON the voice operated transmitter only when the input signals occur within the specified passband.

2 Claims, 5 Drawing Figures

FILTER FOR VOICE OPERATED TRIGGERING CIRCUITS

This invention relates to VOX (voice operated relay) triggering circuits and more particularly to circuits for preventing inadvertent keying of VOX controlled transmitters.

Heretofore, various digital type filter circuits have provided various filtering in different types of systems. Englebrecht, L.C., "Digital Filter Circuit for Noisy Lines," I.B.M. TECHNICAL DISCLOSURE BULLETIN, Vol. 19, No. 1, June, 1976, pp. 260–261 shows a digital filter circuit comprising a time delay triggered retriggerable monostable multivibrator and a "D" type flip-flop which discriminates on the basis of pulse width changes and not on the basis of frequency changes as the present digital filter circuit, nor which is utilized to prevent inadvertent keying of VOX operated transmitters as in the present system. Other exemplary digital filter circuits include U.S. Pat. No. 3,676,699 issued July 11, 1972 showing an asynchronous pulse width filter having four two-state logic circuits and U.S. Pat. No. 3,747,025 issued July 17, 1973 showing two bandpass filters connected in parallel, each having different pass characteristics and utilized in testing and measuring applications. Further, multiple monostable multivibrator circuits representative of the prior art are shown in U.S. Pat. No. 3,678,396 and FIG. 19 of U.S. Pat. No. 3,845,377.

It is an object of this invention to provide filtering in a VOX circuit for preventing inadvertent keying of a VOX controlled transmitter.

It is a further object of this invention to provide filter circuit means for reducing the effective keying passband of a voice operated relay circuit.

It is another object of this invention to provide digital filter circuit means having a passband within the voice spectrum for preventing keying of a VOX circuit by signals outside the passband.

It is yet another object of this invention to provide a high frequency digital type VOX filter which discriminates on the basis for frequency changes.

These and other objects of this invention are accomplished, in accordance with a preferred embodiment of the invention by generation of input signals in the form of pulses which follow the peak frequency pattern of audio input signals. These pulses are coupled to the input of a retriggerable monostable multivibrator which initiates a positive going 1.3 millisecond pulse at its output, and approximately 30 microseconds later to the input of a further retriggerable monostable multivibrator which initiates a negative-going 3 millisecond pulse at its output. The output pulses from the multivibrator are coupled to input terminals of a "D" type flip-flop circuit whose output is supplied to a NOR gate along with the positive-going 1.3 millisecond pulse to produce positive output pulses utilized to trigger ON the voice operated transmitter only when the input signals occur within a predetermined passband, viz. from 330 Hz to 860 Hz.

Further objects, features and advantages of the invention will readily become apparent from the following specification and from the drawings, in which.

Figure 1:
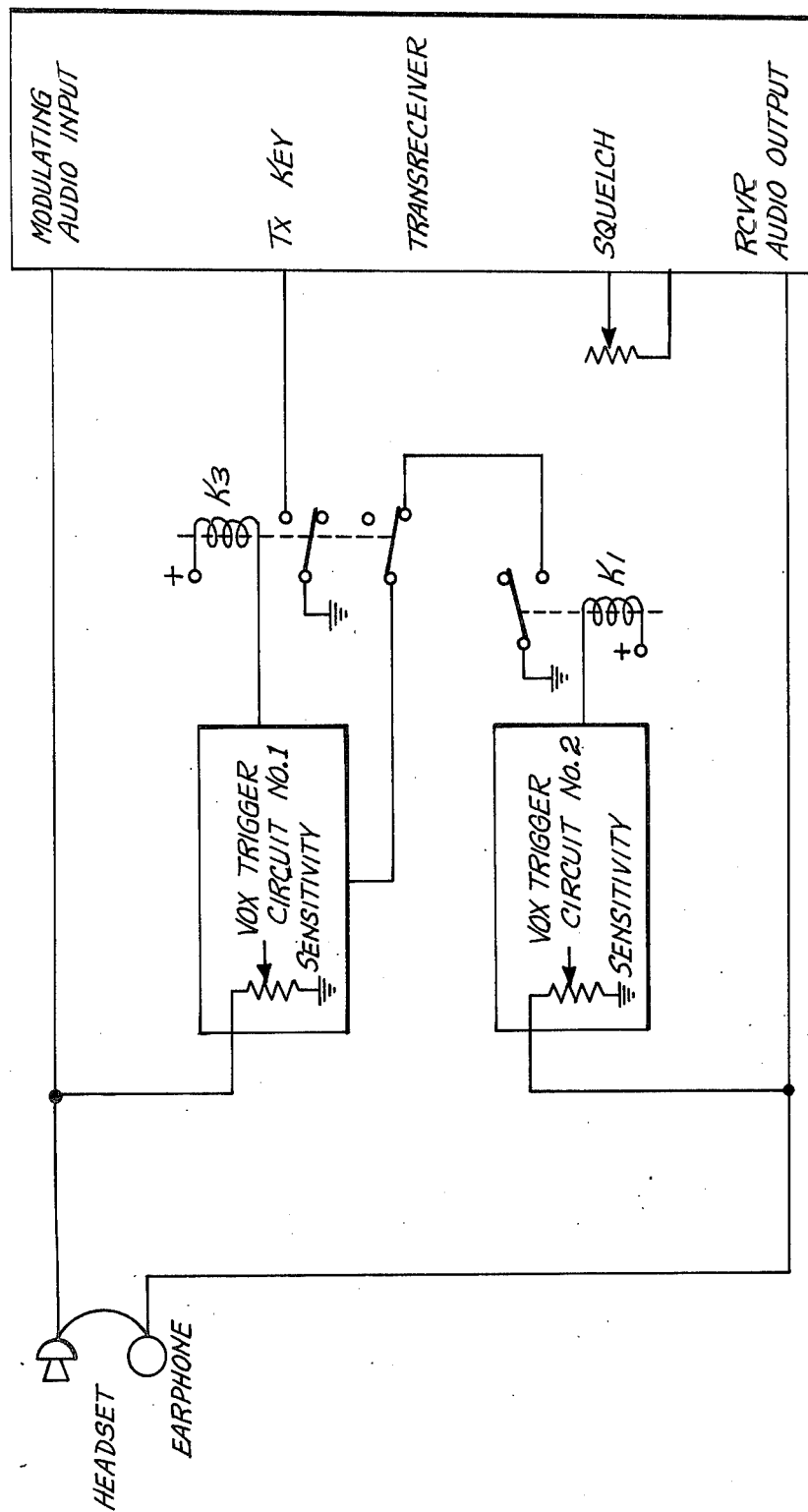
FIG. 1 is a block diagram illustrative of a transceiver communications system showing first and second VOX trigger circuits which utilize the present digital filter for reducing the effective keying passband.
Figure 3A:
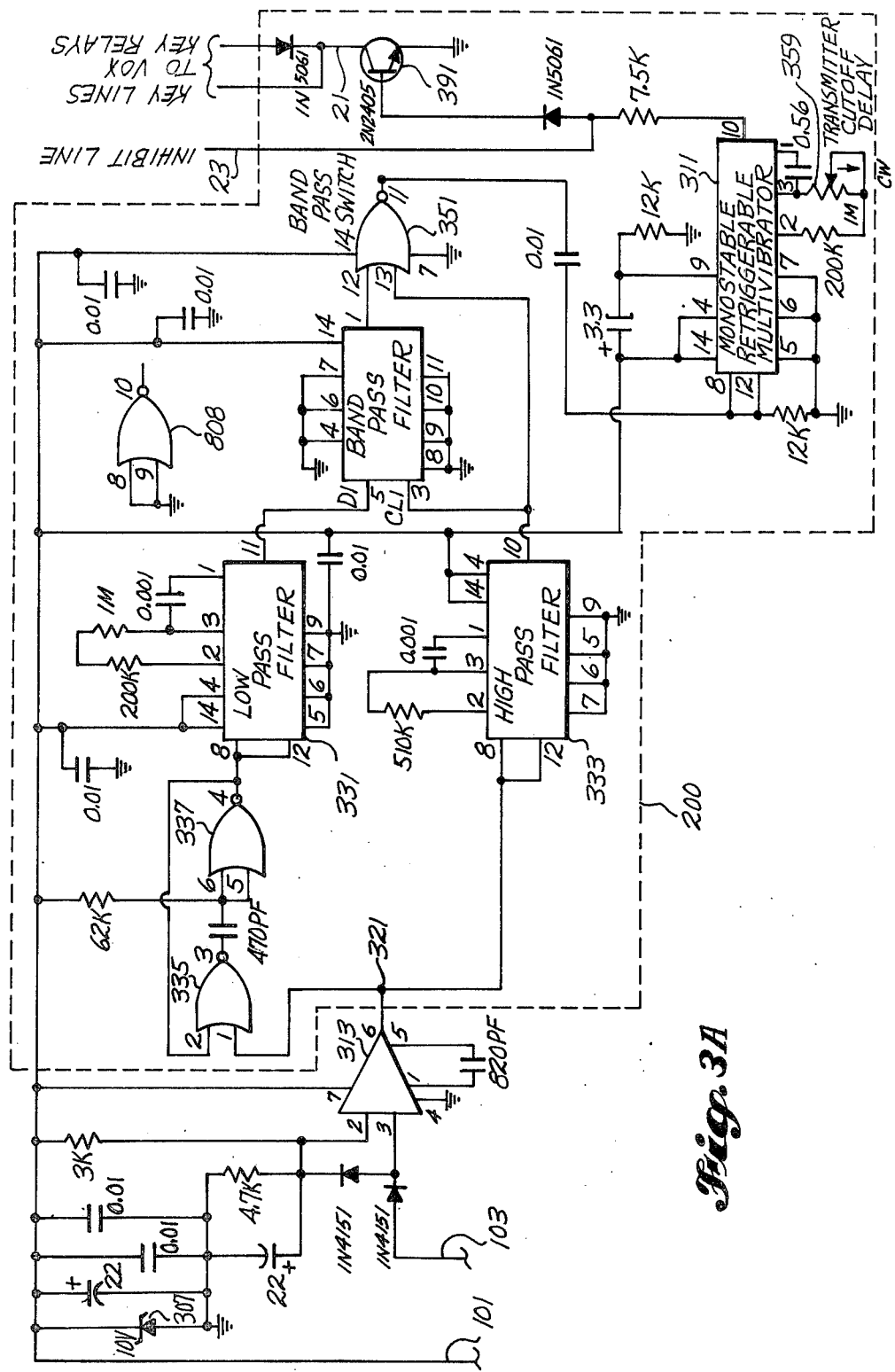
Figure 3B:
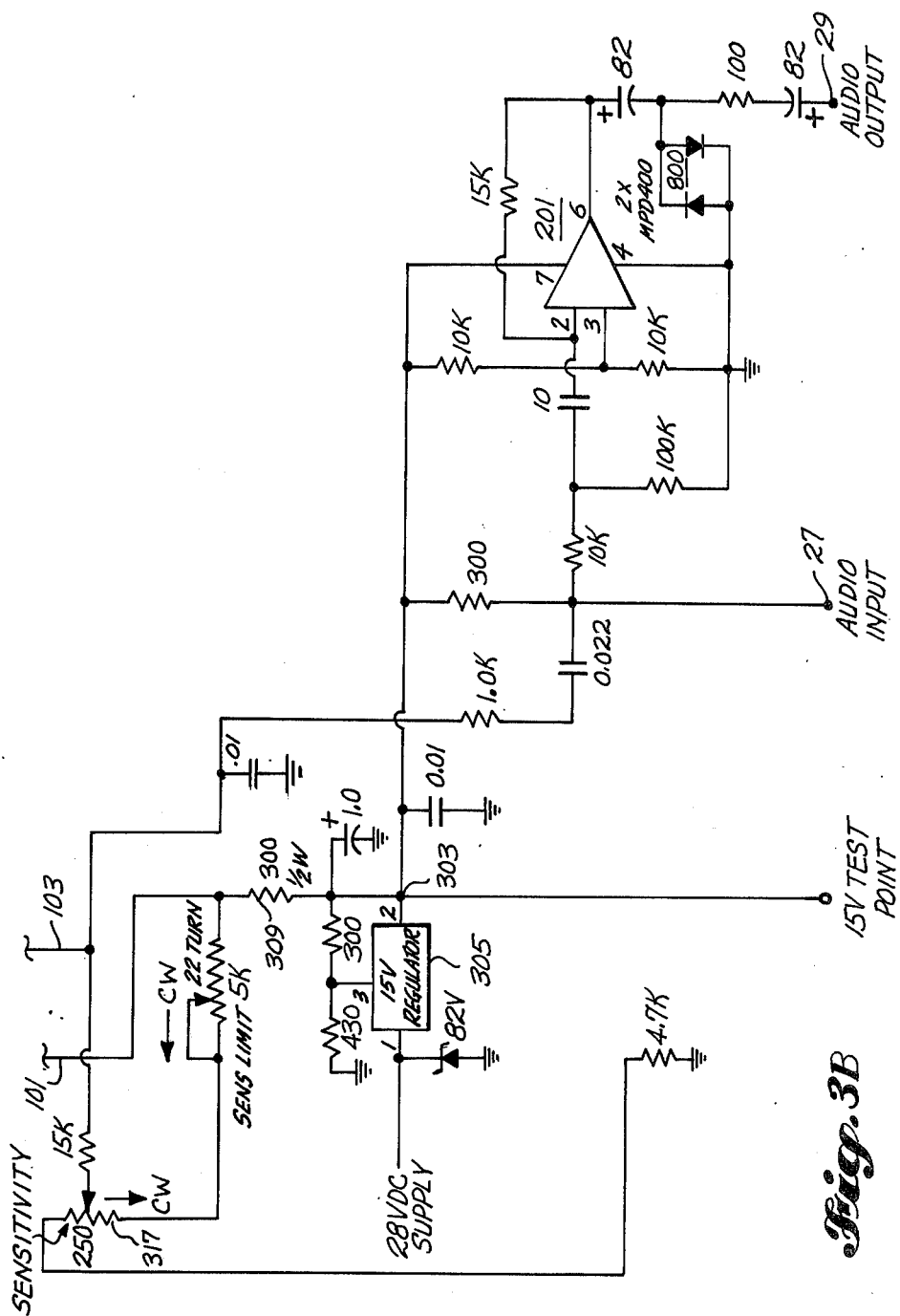
Figure 4:
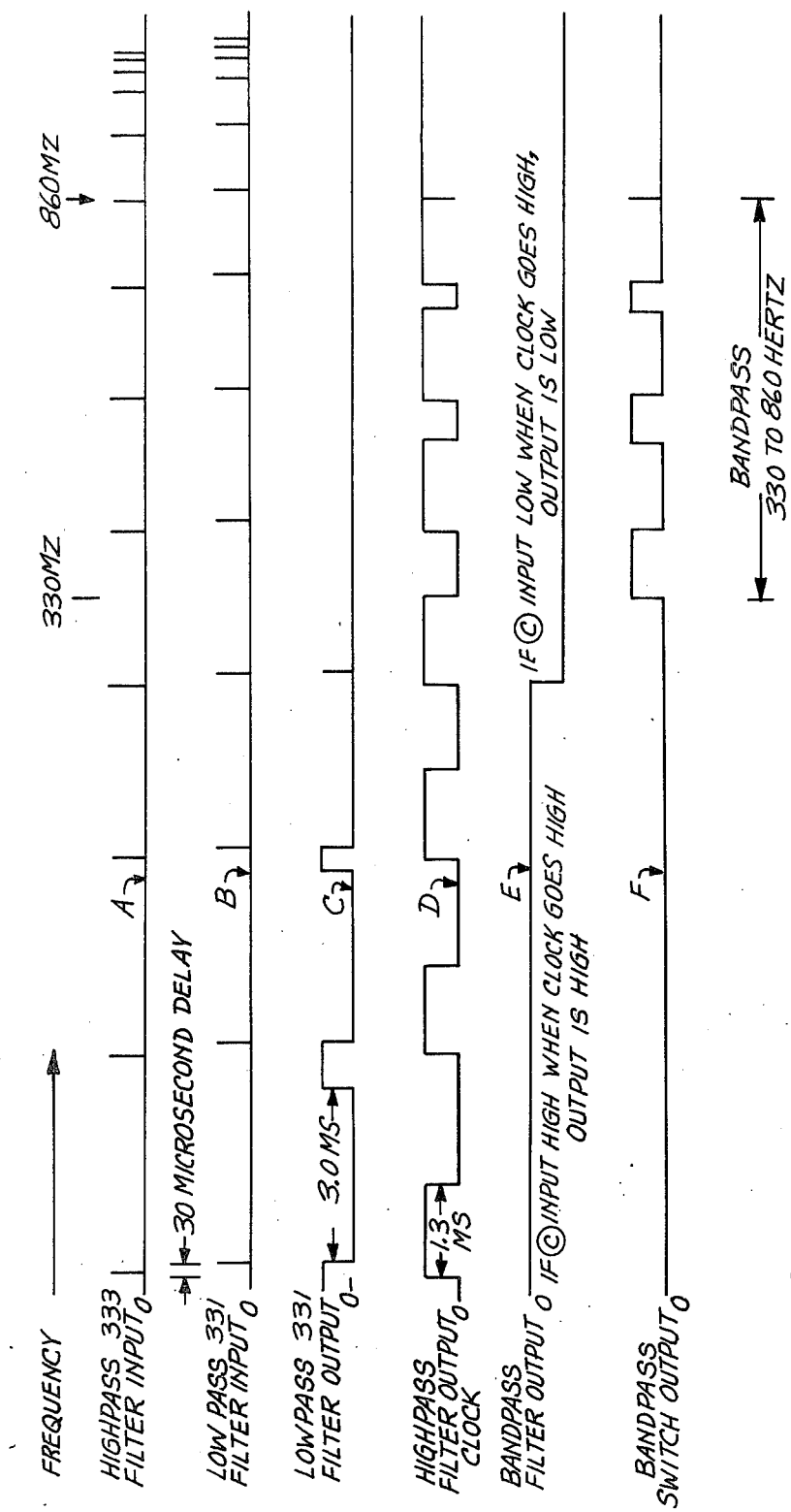

FIG. 3A is the upper half of a circuit schematic of the VOX trigger circuits shown in FIG. 1 showing the digital filter, and when placed above FIG. 3B and connected thereto by the pair of leads broken away completes the bottom half of the circuit schematic of the VOX trigger circuits shown in FIG. 1; and, FIG. 4 is a timing diagram illustrative of the logic and operation of the digital filter shown in FIG. 3A.

Turning now to FIG. 1 it can be seen that in an aircraft environment, where it is desired to key by voice operation transceiver 10, that for each telephone 12 a first VOX circuit 14 provides transmitter keying by operator speech while second VOX circuit 16 is connected to the receiver output of transceiver 10 to prevent radio receiver reception from being interrupted by inadvertent VOX transmitter keying.

When radio signals are being received, relay K1 energizes and inhibits transmit VOX trigger circuit 14, thereby preventing the transmitter from being keyed. When radio signals are not being received with sufficient signal strength to key receiver VOX trigger circuit 16, normal transmitter keying by voice is permitted. However, once keyed, relay K3 is energized and open the inhibit line (discussed in more detail in connection with the description of FIG. 2A), thereby preventing receiver VOX circuit 16 from inhibiting transmit VOX circuit 14 until a transmission period is completed.

Figure 2:
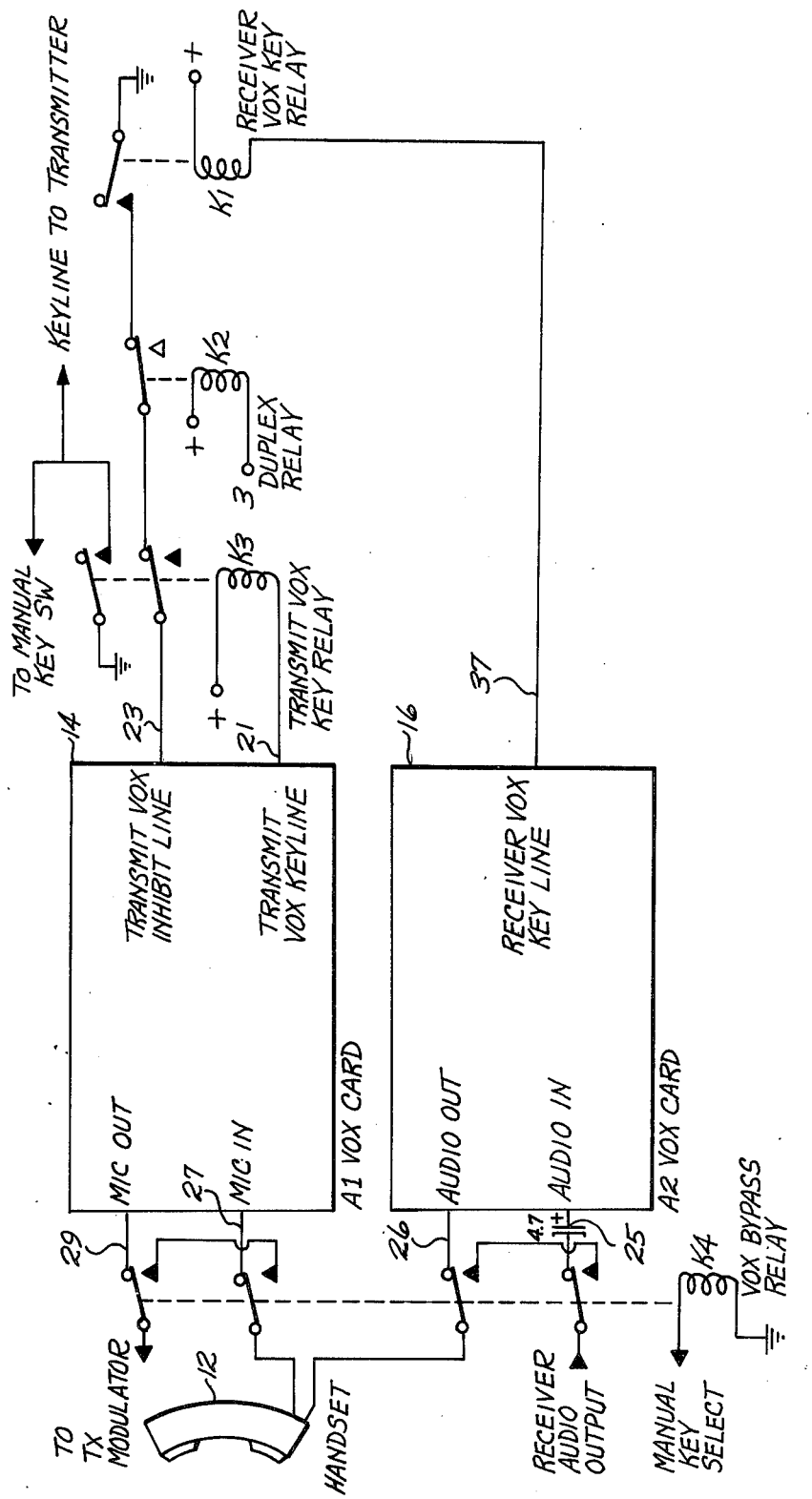
FIG. 2 is a block diagram showing in more detail how the VOX trigger circuits of the system of FIG. 1 are controlled by the utilization of four relays.

Turning now to FIG. 2 it will be noted that a further pair of relays K2 and K4 are shown which are utilized for switching over to manual P.T.T. (push to talk) operation and for deactivating the inhibit line (hereinbefore mentioned and hereinafter described in more detail) when duplex operation of systems is desired. As hereinbefore described in connection with the system shown in FIG. 1, it was noted that a transmit VOX circuit 14 and receive VOX circuit 16 are connected in a manner which provides activation of a transceiver transmit key in response to audio signal from a microphone. Also the key is maintained in an active condition during normal breaks in speech modulation due to short pauses between syllables, words, and sentences. Also VOX circuits 14 and 16 each include a digital filter shown in FIG. 3A and described hereinafter in detail, which filter has a bandpass of approximately 300 to 900 Hz to reduce false activation of the key line by the appearance of undesired noise signals across the input terminals. The input of transmit VOX circuit 14 is connected to the microphone of telephone handset 12. VOX circuit 14 is utilized to key the radio transmitter portion of transceiver 10 (seen in FIG. 1), but under certain conditions, transmit keyline 21 may become deactivated by means of an inhibit circuit providing inhibit line 23 signals (see also FIG. 3A). The input of receive VOX circuit is coupled to receive audio output signals 25 from the transceiver receiver. Relays K1, K2, K3, and K4 are utilized to control VOX circuits 14 and 16. Transmit VOX key relay K3 has the inhibit line to transmit VOX circuit 14 routed through the normally closed contacts thereof. However, once keyed, relay K3 becomes energized, thereby preventing transmissions from being interrupted by receive VOX circuit 16. When radio signals are being received, the signal output 25 from the receiver activates receive VOX circuit 16, thereby energizing receive VOX key relay K1. The contacts of relay K1 provide a ground path through the closed contacts of transmit VOX key relay K3 to inhibit transmit VOX circuit 14. Therefore, no VOX radio transmissions are possible from the aircraft until receive VOX circuit 16 is permitted to deenergize by a break in reception lasting longer than about 1.5 seconds. The nature of circuitry providing for this delay will be understood from the description read subsequently in connection with FIGS. 3A–B and 4. The inhibit line to transmit VOX circuit 14 is also coupled through the normally closed contacts of stop inhibit relay K2. Relay K2 is energized during duplex radio operation to permit simultaneous transmission and reception using two radio systems at each communications path terminal and employing two operating frequencies. VOX bypass relay K4, when activated, permits microphone and received audio signals to bypass VOX circuits 14 and 16 for normal P.T.T. operation when so desired by the operator.

In VOX keying of a radio transceiver the following general considerations are believed to be of interest:

When operating a simplex radio system (i.e. same radio utilized for transmit and recive purposes) whenever the radio transmitter is keyed, (in transmit mode) the radio received signal becomes inhibited. If VOX keying is utilized, this feature of the radio can be annoying, since any noise into the microphone circuit could key the radio, and hence inhibit the signal being received. The circuitry of FIG. 2 and FIGS. 3A and B hereinafter described prevent the aforementioned annoyance and assumes a good received signal to noise ratio (i.e. a squelched radio). In the operation of the VOX key inhibit circuit of FIG. 2 it can be noted that, assuming no received signal and therefore no VOX key inhibit activation, activation of the keyline is via. VOX circuit 14 and relay K3 which are operated by talking into the microphone of handset 12. Also, sidetone will not operate the VOX key inhibit function into transmit VOX circuit 14 since VOX key inhibit line 23 is opened by relay K3 if activated by the microphone during a no-receive period. Further, if the VOX key is not operated, a receive signal will inhibit it via. receiver VOX circuit 16 and relay K1 contacts. Also under operating conditions, relay K2 stops VOX key inhibit action if the operator has selected duplex operation (i.e. one transceiver for transmit and one for receive). If the operator decides that the receiver has insufficient signal to noise ratio, manual P.T.T. control can be selected by energizing relay K4. Also it might be noted that the operator cannot interrupt a valid received signal except by manual override, but in any event, an interrupt feature is of no use since the sender of the operators received signal could not hear the operators transmitted signal until he (the sender) ceased transmitting.

Now positioning FIG. 3A above FIG. 3B with corresponding leads 101 and 103 connected together, it will be seen that transmit VOX circuit 14, shown in the combined FIGS. 3A and 3B, is provided with audio input terminal 27 and audio output terminal 29, and includes an output inhibit line 23 and key line 21. Referring back to FIG. 2, it will be seen that receive VOX circuit 16 has corresponding audio input terminal 25 and audio output terminal 26, and also includes a key line 37, but that no corresponding inhibit line from receive VOX circuit 16 is needed for VOX trigger circuit system control. Since VOX circuits 14 and 16 are otherwise the same except for the need for inhibit line 23. FIG. 3A–B showing inhibit line 23, as utilized in transmit VOX circuit 14, will now be described, and comprises unity gain isolation amplifier circuit 201 and the remaining voice-actuated transmitter keying circuitry connected between terminals 27 and 29 and terminals 21 and 23, which keying circuit includes digital band pass filter circuit 200 that limits triggering frequencies to within the 330 to 860 Hz range and provides very sharp cut-off at these upper and lower frequency limits.

Transmitter VOX circuit 14 shown in FIGS. 3A–B utilizes a plurality of integrated circuits which are energized by 15 volt and 10 volt D.C. supplies. The 15 volt supply at terminal 303 is obtained from the 28 volt supply utilizing regulator circuit 305 comprising an LM 309 15 volt regulator. The 10 volt supply is provided by zener diode 307 and resistor 309 connected to the 15 volt supply voltage provided at terminal 303. As hereinbefore mentioned the microphone audio input is connected to audio input terminal 27. Output from unity gain amplifier circuit 201 is provided at audio output terminal 29. The output of monostable retriggerable multivibrator circuit 311 (comprising a type CA 4047), when triggered, applies base current to saturate NPN (type 2N 2405) transistor switch 391, thereby grounding key line 21 to operate the transmitter keying relay. Audio signals applied to input terminal 27 of the transmit VOX circuit are rectified prior to being applied to comparator circuit 315 which includes type LM 201 comparator 313. Sensitivity control provided by potentiometer 317 may be adjusted to trigger comparator circuit 3154, when the applied signal exceeds a predetermined level. Comparator circuit 315 output comprises positive going pulses occurring at the frequency of the audio input and are applied to input terminal 321 of filter circuit 200. These positive polarity pulses at audio frequencies are coupled to low pass filter circuit 331 and also to high pass filter circuit 333. These pulses, coupled to low pass filter circuit 331, are delayed approximately 30 microseconds by coupling through first and second NOR circuits 335 and 337 (see lines A and B of FIG. 4). Each positive going pulse at input terminals 8 and 12 of high pass filter 333 generates a positive-going pulse output from pin 10 thereof. This output pulse is of approximately 1.3 milliseconds duration. At input frequencies of 860 Hz or above, the pulses overlap and the output is continuously high (see waveform D of FIG. 4).

Each positive going pulse at pins 8 and 12 of low pass filter 331 generates a negative going pulse from pin 11 of low pass filter 331. This negative pulse is of approximately 3.0 millisceconds duration. At input frequencies of 330 Hz or above, the pulses overlap and the output is continuously low (see waveform C of FIG. 4).

Bandpass filter 341 is responsive to clock strobes provide by the output pulses at terminal 10 of high pass filter 333 and is also responsive to negative going pulses at output terminal 11 of low pass filter 331. Upon the occurrence of each positive going strobe, bandpass filter circuit 341 shifts the input thereof from the low pass filter to its output terminal (pin 1 of bandpass filter 341). If pin 5 input level is low when strobed, pin 1 output will be low. If pin 5 input is high when strobed, pin 1 output will also be high. Since low pass filter circuit 331 and high pass filter circuit 333 respond to the same input, and since low pass filter 331 input is delayed 30 microseconds, bandpass filter pin 5 input will always be high when strobed at frequencies below 330 Hz. Above 330 Hz, bandpass filter pin 5 input (waveform C of FIG. 4) will be continuously low.

Bandpass switch 351 cannot have a high output unless both inputs are low. Below 330 Hz, pin 12 input of bandpass switch 351 (waveform E of FIG. 4) is continuously high. Above 330 Hz, pin 12 input of bandpass switch 351 is continuously low and a high output is possible. Above 860 Hz, pin 13 input of bandpass switch 351 (waveform D of FIG. 4) is continuously high. Below 860 Hz, pin 13 input of bandpass switch 351 is pulsed. Therefore the bandpass filter circuit has 2 low inputs simultaneously on a pulsed basis when the audio frequency is between 330 and 860 Hz (waveform F, FIG. 4).

Each positive going pulse output from bandpass switch 351 triggers a high output from monostable retriggerable multivibrator 311 that lasts about 1.5 seconds (this pulse adjustable by potentiometer 359). The high output turns transistor switch 391 on to energize the transmitter-keying relay (not shown). The transmitter will therefore be keyed continuously while an audio input in the 330–860 Hz range is present, and for approximately 1.5 seconds after the audio input ceases.

As hereinbefore noted, potentiometer 359 (a variable resistance, ranging from 0.2 megohms to 1.2 megohms) is utilized to control time period and consequently keying time. This time is adjustable from 0.58 seconds to 3.35 seconds. If other pulses arrive at the input terminals of monostable multivibrator circuit 311 (type CA 4047) before the keying period has elapsed, the period is reinitiated. This action ensures that breaks in speech transmissions into the microphone, due to short pauses between words and sentences, do not cause the radio transmitter keying relay to deenergize. Audio input signals at audio input terminal 27 were applied as hereinbefore mentioned to both comparator circuit 315 and unity gain amplifier circuit 201, the circuit 201 (comprising a type 741 op. amp.) being necessary in order to isolate the audio line to the radio transmitter modulator circuits from the input terminals of the VOX circuit. The presence of induced interference on this line, when the transmitter keying relay is deenergized, would recycle the VOX keying function if isolation was not so provided. The isolation is designed for unity gain when feeding into a load impedance of 150 ohms. Diodes 800 (comprising MPD 400 four layer diodes) of unity gain amplifier circuit 210 are included to protect the 741 op. amp. from the effects of high level transients which may be present on the audio line.

Returning to filter circuit 200 of FIG. 3A again briefly, it should be noted that NOR circuits 335 and 337 comprise type CD 4001 while low pass filter 331 and high pass filter integrated circuits comprise type CD 4047 and bandpass filter 341, a type CD 4013 with bandpass switch 351 comprising a D of CD 4001, the C connections therefor shown at 808. The following CD 4013 truth table for band-pass filter 341 is provided:

| CL | D1 | Q1 |
|---|---|---|
| ⌐ | 0 | 0 |
| ⌐ | 1 | 1 |
| ⌐ | X | No Change |

I claim:
1. In combination in a system for energizing a transmitter keying relay in response to pulses occurring at the frequency of audio input pulses:
high pass filter circuit means responsive to said pulses;
delay circuit means responsive to said pulses for delaying said pulses for a predetermined time period;
low pass filter circuit means responsive to said pulses delayed for a predetermined time period;
bandpass filter circuit means coupled between said high pass filter circuit and low pass filter circuit means, said bandpass filter circuit means having an output terminal connected to a bandpass switching circuit means; and
monostable retriggerable multivibrator circuit means coupled between said bandpass switching circuit means and output means including an inhibit line output terminal and switching means for providing said transmitter keying relay energizing signals to key the transmitter continuously when audio input signals having frequencies in a predetermined passband are present and for a given time period after said audio input signals are no longer present.

2. The invention according to claim 1 wherein the predetermined time period of said delay circuit means is selected to provide output pulses from said low pass filter circuit means and said high pass circuit means to overlap at frequencies about 860 Hz.

* * * * *